(12) United States Patent
Moreno et al.

(10) Patent No.: US 9,565,034 B2
(45) Date of Patent: Feb. 7, 2017

(54) SYSTEM AND METHOD FOR SCALABLE INTER-DOMAIN OVERLAY NETWORKING

(71) Applicant: CISCO TECHNOLOGY, INC., San Jose, CA (US)

(72) Inventors: Victor Manuel Moreno, Carlsbad, CA (US); Dhananjaya Rao, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/103,633

(22) Filed: Dec. 11, 2013

(65) Prior Publication Data
US 2015/0163323 A1 Jun. 11, 2015

(51) Int. Cl.
G06F 15/16 (2006.01)
H04L 12/46 (2006.01)
H04L 12/715 (2013.01)

(52) U.S. Cl.
CPC ....... H04L 12/4675 (2013.01); H04L 12/4679 (2013.01); H04L 45/04 (2013.01); H04L 45/64 (2013.01)

(58) Field of Classification Search
CPC .................... H04L 29/08072; H04L 29/08144; H04L 29/08135
USPC ........................................................ 709/201
See application file for complete search history.

(56) References Cited

U.S. PATENT DOCUMENTS 7,185,107 B1 * 2/2007 Cassar ................ H04L 61/6068
370/346

8,259,571 B1 * 9/2012 Raphel ................ H04L 61/2592
370/230
2006/0262735 A1 11/2006 Guichard et al.
2009/0037607 A1 * 2/2009 Farinacci ............ H04L 12/4641
709/249
2009/0103538 A1 4/2009 Yoshimi
2010/0124231 A1 5/2010 Kompella
2013/0089093 A1 * 4/2013 Bacthu ................ H04L 12/4633
370/390
2013/0103834 A1 * 4/2013 Dzerve ................... H04L 67/10
709/225
2013/0142201 A1 * 6/2013 Kim ..................... H04L 12/4633
370/392

(Continued)

FOREIGN PATENT DOCUMENTS

WO WO2015/088924 6/2015

OTHER PUBLICATIONS

PCT Jun. 14, 2016 International Preliminary Report on Patentability and Written Opinion from International Patent Application Serial No. PCT/US2014/068972.

(Continued)

*Primary Examiner* — Vivek Srivastava
*Assistant Examiner* — Atta Khan
(74) *Attorney, Agent, or Firm* — Patent Capital Group (57) ABSTRACT

An example method is provided in one example embodiment and includes receiving first values associated with a host located in a first overlay domain; translating the first values to second values, the second values being local values in a second overlay domain; storing the second values and corresponding first values in a mapping table for the second overlay domain; and advertising the second values for the host in the second overlay domain.

9 Claims, 6 Drawing Sheets (56) References Cited

U.S. PATENT DOCUMENTS

| | | | |
|---|---|---|---|
| 2013/0311663 A1* | 11/2013 | Kamath | H04L 29/08576 709/227 |
| 2013/0332602 A1* | 12/2013 | Nakil | G06N 99/005 709/224 |
| 2014/0086253 A1* | 3/2014 | Yong | H04L 12/4633 370/395.53 |
| 2014/0108624 A1* | 4/2014 | Grundemann | H04L 45/14 709/220 |
| 2014/0112349 A1* | 4/2014 | Moreno | H04L 45/64 370/400 |
| 2015/0063351 A1 | 3/2015 | Moreno et al. | |

OTHER PUBLICATIONS

PCT Mar. 10, 2015 International Search Report and Written Opinion from International Patent Application Serial No. PCT/US2014/068972.

* cited by examiner

FIG. 4

SYSTEM AND METHOD FOR SCALABLE INTER-DOMAIN OVERLAY NETWORKING

TECHNICAL FIELD

This disclosure relates in general to data networks and more particularly, to a method, a system, and an apparatus for scalable inter-domain overlay networking within data networks.

BACKGROUND

Interconnecting the overlay networks of multiple organizations within a data network becomes a fundamental requirement, as overlay networks proliferate in number. The number of organizations having virtualized overlay networks continues to grow and the requirements on the mechanisms used to provide this interconnectivity in a scalable manner become critical to the success of these virtualized networks.

In the simplest interconnectivity model, an overlay would be fully terminated at the edge of an organization and mapped to a different overlay that is managed by either a peer organization or a service provider of data transit services. In either case, the edge devices between organizations must maintain the full state of all routes for all organizations that are peering to each other. As mobility becomes more widely adopted, the routing information for the different organizations becomes very granular and does not benefit from summarization in an edge device. The net result is an explosion in the amount of states and information that an edge device must maintain.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided in one example embodiment and includes receiving first values associated with a host located in a first overlay domain; translating the first values to second values, the second values being local values in a second overlay domain; storing the second values and corresponding first values in a mapping table for the second overlay domain; and advertising the second values for the host in the second overlay domain. In more specific embodiments, advertising the second values comprises sending the second values associated with the host to a tunnel endpoint of the second overlay domain. In certain cases, the method can include storing the second values associated with the host in a host location table for the second overlay domain. The translating and storing can be performed, for example, in a gateway of the second overlay domain. Advertising the second values can comprise advertising the gateway associated with the host in the second overlay domain.

In certain implementations, the first values comprise a tunnel endpoint identifier and a first virtual network identifier identifying, respectively, a tunnel endpoint and virtual network associated with the host in the first overlay domain, and the translating can comprise translating the tunnel endpoint identifier to a gateway identifier of a gateway in the second overlay domain and translating the first virtual network identifier to a second virtual network identifier of a virtual network in the second overlay domain to generate the second values.

Advertising the second values can comprise sending the gateway identifier and the second virtual network identifier as the second values and an indication that the second values are associated with the host to a tunnel endpoint in the second virtual network. The storing further comprises storing an encapsulation indicator with the first values, the encapsulation indicator indicating an encapsulation scheme for the first overlay domain.

The host can be a destination host, for example, and the method can further comprise storing the advertised second values as the location of the destination host in a host location table for the second overlay domain; receiving a packet directed to the destination host from a source host; and sending the packet directed to the second values in the second overlay domain. In yet other embodiments, the method can include receiving the packet directed to the second values in the second overlay domain; and matching the second values to the first values of the first overlay domain; and sending the packet to the destination host by directing the packet to the first values in the first overlay domain.

Example Embodiments

Figure 1A:
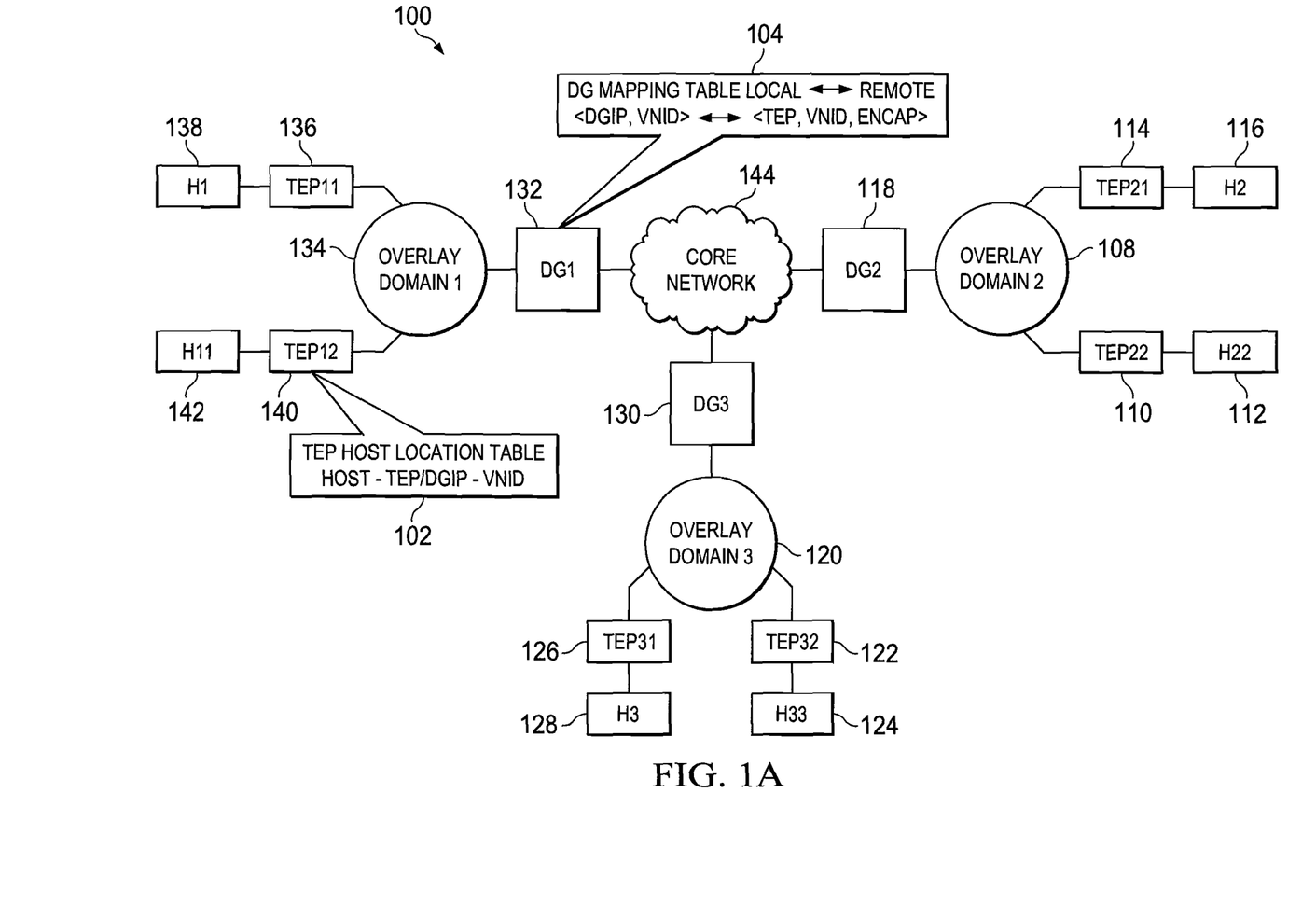
FIG. 1A is a simplified block diagram illustrating a network into which an example embodiment of the disclosure may be implemented.

Referring now to FIG. 1A, therein is a simplified block diagram illustrating a network 100 into which an example embodiment of the disclosure may be implemented. FIG. 1A shows network 100 which includes overlay domain2 (OD2) 108, overlay domain1 (OD1) 134, overlay domain3 (OD3) 120, tunnel endpoint 11 (TEP11) 136, tunnel endpoint 12 (TEP12) 140, tunnel endpoint 21 (TEP21) 114, tunnel endpoint 22 (TEP22) 110, tunnel endpoint 31 (TEP31) 126, tunnel endpoint 32 (TEP32) 122, domain gateway1 (DG1) 132, domain gateway2 (DG2) 118, domain gateway3 (DG3) 130, core network 144, and hosts, H1 138, H11 142, H2 116, H22 112, H3 128 and H33 124. FIG. 1A also shows a representation of DG mapping table 104 associated with DG1 132 and TEP Host Location Table 102 associated with TEP12 140. The overlay domains (overlay domain1 134, overlay domain2 108 and overlay domain3 120) are the portions of the network 100 that are autonomous overlay networks or systems from the overlay perspective and may represent any type of network or system such as, for example, organizational networks, in which the example embodiments may be implemented. The overlay domains are the networks that may be interconnected and that may communicate through use of the example embodiments of the disclosure. The tunnel endpoints of the embodiment of FIG. 1A (tunnel endpoint 11 (TEP11) 136, tunnel endpoint 12 (TEP12) 140, tunnel endpoint 21 (TEP21) 114, tunnel endpoint 22 (TEP22) 110, tunnel endpoint 31 (TEP31) 126, and tunnel endpoint 32 (TEP32) 122) may be implemented as edge nodes or devices at which the overlay domains start and terminate with the encapsulation or de-capsulation of data traffic.

A method, a system, and an apparatus for interconnecting overlay domains within data networks are disclosed in the example embodiments of the disclosure. The example embodiments of the method, system, and apparatus allow overlay domain interconnection without maintaining full routing state/information in network routers or nodes that are at the borders of such overlay domains. The example embodiments also provide translation of Virtual Network Identifiers (VNIDs) between domains and provide termination and translation of encapsulation formats at border routers or nodes in order to allow interoperability between overlay domains that use different overlay encapsulations.

In one example embodiment, the method, system, and apparatus may be implemented in a network that includes a plurality of overlay domains. Each overlay domain is an autonomous system from the overlay standpoint and may also include one or more segments or virtual networks identified by Virtual network identifiers (VNID). Each overlay domain may also have at least one edge device (domain gateway) on its border to provide connections with other overlay domains though a core network and one or more tunnel endpoints (TEPs) including destination TEPs (DTEPs) and source TEPs (STEPS) attached to end hosts amongst which communication happens. In the example embodiment, an overlay control plane may be implemented in the network. The overlay control plane provides the exchange of information between overlay domains that is used to connect the overlay domains. For example, the overlay control plane may implement the advertising of information that is used to connect the overlay domains between the overlay domains.

The domain gateways may act as overlay control plane translation points for mapping information received via the overlay control plane and translate local to remote values. A domain gateway includes a list of local <DTEP, VNID> values each representative of a corresponding remote location <DTEP, VNID, Encap.> value that is mapped to it. In the embodiment, when a local domain gateway receives overlay control plane information as values of a particular remote host for a remote overlay network, it does not store the host information but instead translates the remote <DTEP, VNID> values to a corresponding local <DTEP, VNID> value for the local overlay network, stores the corresponding remote and local values, and advertises or forwards the remote host's local <DTEP, VNID> value mapping information to the STEPs in the local overlay domain.

Once a STEP receives the translated information, the STEP has full overlay forwarding information for that specific remote host. The term advertising or advertised as used in this disclosure and claims may comprise any method of transferring, transmitting of sending values to the appropriate domain gateways and tunnel endpoints for implementing the functions of the example embodiments. The term translate or translating is meant to include any method of converting a value to a corresponding value, including for example, using look up tables, software programs, or values stored in any type of memory.

In operation of one example embodiment, a local <destination tunnel endpoint, virtual network ID> (<DTEP, VNID>) tuple for traffic sent from a source host in a first overlay network to a destination host in a second overlay network can be mapped uniquely to a remote <DTEP, VNID, Encap-type> tuple at the edge of the first overlay network. The mapping provides enough information for the domain gateway router at the edge of the first overlay network to forward the traffic to the correct remote destination tunnel endpoint with the correct remote VNID and correct encapsulation. Since a multitude of hosts may attach to a given tunnel endpoint, the use of the remote <DTEP, VNID> as the destination on the domain gateway significantly reduces the amount of state information required to be maintained at the domain gateway.

Use of the embodiments of the disclosure prevents the need to create virtual routing functions (VRFs) on the domain gateways. Even with 32K VRF support, the number of virtual networks can be quite large. With 100,000 virtual networks six boxes are needed and the number of FIB entries with 1,000 edge nodes (100 virtual networks per virtual node) would be (1,000) (100)=100,000 FIB entries. The embodiments may be used for bothIP as well as MAC based tenant route entries (ie, L3 and L2 respectively) and work similarly for unicast MACs, installed by a control plane. In addition, the embodiments of the disclosure provide an advantage over a data center gateway in that data center gateways deal only with virtual network instances (VNI)+ TDA, and not with inner MACs.

The tunnel endpoints may be implemented in any type of network node that may perform the routing or switching functions according to the embodiments of the disclosure. A tunnel endpoint may be referred to a source TEP (STEP) or destination TEP (DTEP), which are encapsulating and de-capsulating devices respectively. The example embodiments can be described with the source TEP and destination TEP being located in different overlay domains. The domain gateways (domain gateway1 (DG1) 132, domain gateway2 (DG2) 118, and domain gateway3 (DG3) 130) are the nodes or devices at the borders of the overlay domains in which the inter overlay domain data traffic encapsulation and virtual network identifiers (VNID) are translated or re-written.

The domain gateways may be located within the network, for example, at data traffic hotspots, in order to reduce the amount of state information that must be maintained. The domain gateways may be implemented in any type of network node that may perform the routing or switching functions according to the embodiments of the disclosure. The hosts (H1 138, H11 142, H2 116, H22 112, H3 128, and H33 124) attach to the network within an overlay domain and represent entities amongst which communication takes place. The hosts may be any kind of device or node that communicates data to or from a network, for example a PC computer, a mobile device, a data storage device, a server computer, a multimedia device, another type of network, etc. Each host may be associated with an end host ID (EID).

While the block diagram of the example embodiment of FIG. 1A shows DG mapping table 104 associated with DG1 132 and TEP Host Location Table 102 associated with TEP12 140, the information/values stored in tables 104 and 102, may be stored elsewhere in network 100, in any type of memory, from which it may be accessed for performing the functions of the embodiments. The DG mapping table 104 and Host location table 102 may also be implemented in any appropriate type of memory or data structure. The Core network 144 of the embodiment of FIG. 1A represents any type of telecommunication or data network, or any combination of types of networks that may transport data and communications between the domain gateways DGG1 132, DG3 130, and DG2 118 for communications between hosts H1 138, H11 142, H2 116, H22 112, H3 128 and H33 124.

Virtual network identifiers (VNIDs) can be used to identify segments in an overlay domain. A segment may also be referred to as a virtual network (VN). VNIDs are unique within an overlay domain and the scope of their validity is the overlay domain. VNIDs do not need to be unique across overlay domains and there is no expectation of uniqueness across overlay domains.

In the network of FIG. 1A, an overlay control plane (OCP) is implemented according to an example embodiment. The overlay control plane is an overlay protocol that conveys the mapping information for EIDs of each of the hosts to the tunneling endpoint and virtual network identifier (<TEP, VNID>) to which they attach. As the overlay control plane cuts across overlay domains, the <TEP, VNID> values may be translated to values of local significance in the overlay domain receiving the overlay control plane messages. The overlay control plane protocol may be a distributed routing protocol such as Border Gateway Protocol (BGP), or a controller or a mapping database based pull protocol such as Locator/Identifier Separation Protocol (LISP).

The example embodiments provide a method, system, and apparatus to interconnect the overlay domains within a network, such as network of FIG. 1A, and not have to maintain reachability information specific to the numerous EIDs of each of the hosts of multiple overlay domains at the domain gateways. The embodiments utilize a mechanism by which the state maintained at the domain gateways is limited to a mapping between local and remote destination tunnel endpoints (DTEPs) and VNIDs. A DTEP is represented by its IP address, which is assumed to be unique and reachable across the different overlay domains.

The tuple of <DTEP, VNID> can be unique even in the cases in which there are VNID value collisions across overlay domains. In the embodiments, a local <DTEP, VNID> tuple may be mapped uniquely to a remote <DTEP, VNID, Encap> tuple at the domain gateway, where the Encap specifies the destination encapsulation type, and this mapping provides enough information for the domain gateway to forward the traffic to the correct remote DTEP with the correct remote VNID and encapsulation. Because a large number of EIDs of hosts may attach to a given tunnel endpoint, the use of the remote <DTEP, VNID> as the destination on the domain gateway should reduce significantly the amount of state required to be maintained at the domain gateway. For example, in a case in which N EIDs attach to one tunnel endpoint, the reduction may be considered to be of N to one.

The overlay control plane may be configured to implement exchange of information to interconnect overlay domains. The domain gateways may act as overlay control plane translation points for the mapping information received via the overlay control plane. The "remote"<DTEP, VNID> value to which an EID of a host is attached may be translated to a "local" a <DTEP, VNID> value at the site receiving the overlay control protocol information. For example, a domain gateway may have a list of local <DTEP, VNID> values, each of which may be representative of a remote location and each of which may have a corresponding remote <DTEP, VNID, Encap> value mapped to it.

When the "local" domain gateway receives the overlay control plane routing information for a specific "remote" EID of a host, instead of storing the EID information, it may translate the remote <DTEP, VNID> values to the corresponding local <DTEP, VNID> values. The domain gateway may then relay the EID to local <DTEP, VNID> mapping information to the source TEP (STEP) in its local OD. Once the STEP receives the translated information it has full overlay forwarding information for the specific EID. As an alternative, this mechanism may be implemented by translating only the VNID and keeping the DTEP constant across overlay domains.

The mappings between local <DTEP, VNID> and remote <DTEP, VNID, Dest-Encap-Type> values may be programmed on the Domain Gateways (DGs) ahead of time. These mappings may be manually provisioned or distributed automatically by a controller. An alternative implementation in which only the VNID is translated and the DTEP is kept constant is simpler as regards the task of configuring these mappings. This alternative in which the DTEP is not translated does require that routing be set up in such a way that the domain gateway can be in the path between overlay domains. For example, using dedicated local DTEPs may allow more detailed control of this behavior.

Figure 2A:
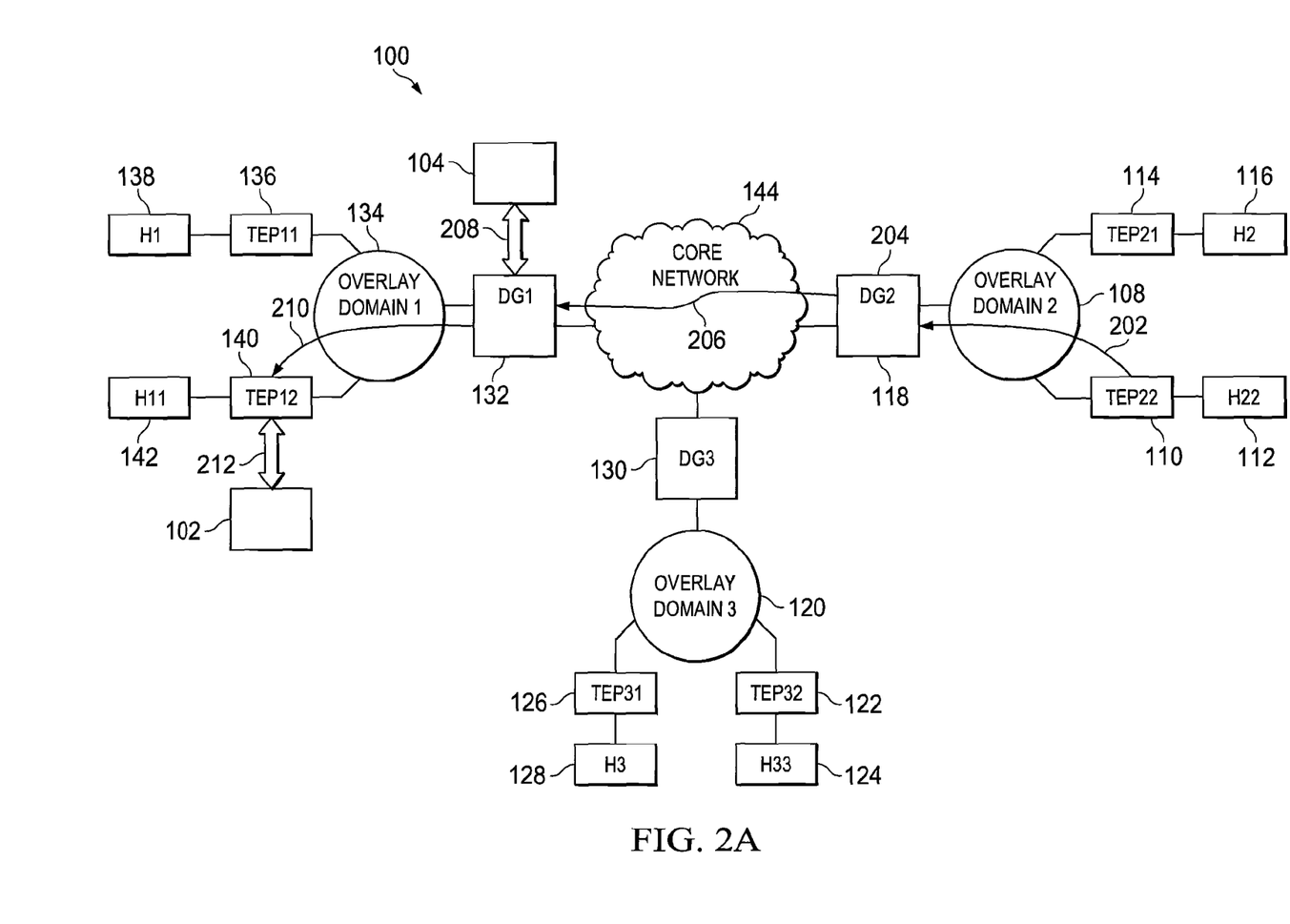
FIG. 2A is a simplified block diagram of the network of FIG. 1A illustrating operations that may be associated with a process for configuring information for overlay interworking in accordance with an example embodiment of the disclosure.
Figure 2B:
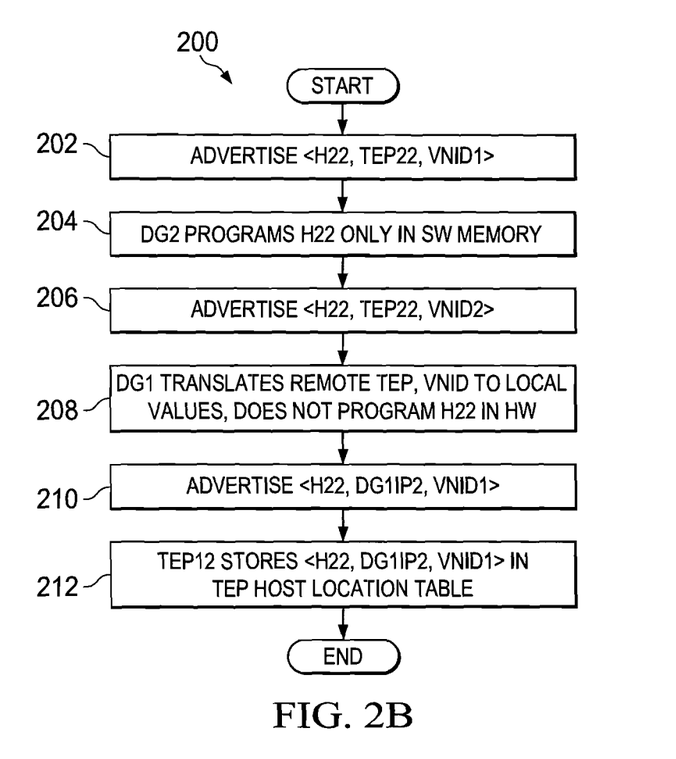
FIG. 2B is a flow diagram illustrating operations that may be associated with the process of FIG. 2A in accordance with an example embodiment of the disclosure.

Referring now to FIGS. 2A and 2B, FIG. 2A is a simplified block diagram of the network of FIG. 1A illustrating an example process for configuring information for overlay interworking and FIG. 2B is a flow diagram illustrating example operations that may be associated with the process of FIG. 2A in accordance with an example embodiment of the disclosure. FIGS. 2A and 2B illustrate an example in which host H22 112 of overlay domain2 108 is advertised to the network through the control plane in order that host H11 142 of overlay domain1 134 may communicate data to H22 112 through network 100. FIG. 2A shows a communication flow through network 100 from TEP22 110 to TEP12 140 with references numerals 202-212 showing the flow path at points in the process. The reference numerals of operations 202-212 of FIG. 2B correlate with the reference numerals 202-212 of FIG. 2A.

The process begins at 202, where <H22, TEP22, VNID2> is advertised in overlay domain2 108 to DG2 118, which is a border node between core network 144 and overlay domain2 108. The term Advertising or advertised as used in this disclosure and claims may comprise any method of transferring, transmitting of sending the <H22, TEP22, VNID2> values to the appropriate domain gateways for implementing the functions of the example embodiments. At 204, DG2 118 then programs H22 in software memory only. At 206, DG2 118 causes <H22, TEP22, VNID2> to be advertised to DG1 132 through core network 144, where DG1 132 is a border node between core network 144 and overlay domain1 134.

At 208, DG1 132 translates the remote TEP, VNID values to local values. For example, DG1 132 may translate the values for remote <H22, TEP22, VNID2> to local values, for example, a value such as <DG1IP2, VNID1>. The local values may be used in overlay domain1 134 by DG1 132 to map data sent from hosts within overlay domain1 134 to the correct destinations of hosts within remote overlay domain2 108. The local to remote value translations may be stored in a mapping table in DG1 132.

Figure 1B:
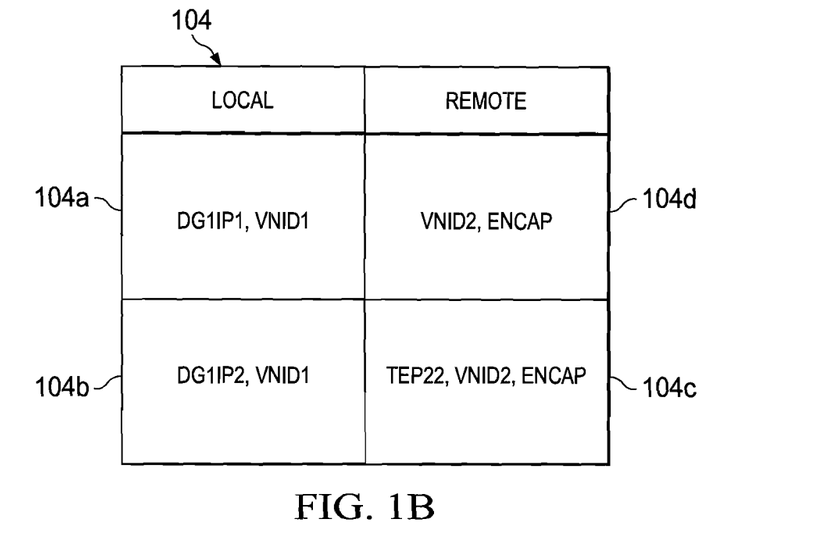
FIG. 1B is a diagram illustrating mapping table data in accordance with an example embodiment of the disclosure.

Referring now to FIG. 1B, FIG. 1B illustrates a mapping table 104 for DG1 132 in accordance with an example embodiment of the disclosure. Table 104 includes example local entries, 104a and 104b, and remote entries, 104c and 104d. Value 104a, <DG1IP1, VNID1>, is mapped to value 104d, <TEP21, VND2, Encap>, and value 104b, <DG1IP2, VNID1> is mapped to values 104c <TEP22, VNID2, Encap>. In the example process of FIGS. 2A and 2B, local values 104b and remote values 104c can be entered at 208. Next, at 210, DG1 132 advertises the mapped local value <DG1IP2, VNID1> for the remote host H22, <H22, DG1IP2, VNID1>, in overlay domain1 134. For example, TEP12 212 may receive the advertised remote value and store the remote value in a host location table associated with H22 112 to use when a host attached to TEP12 212, such as for example, H11 142, has data to send to destination H22 112 in overlay domain2 108.

Figure 1C:
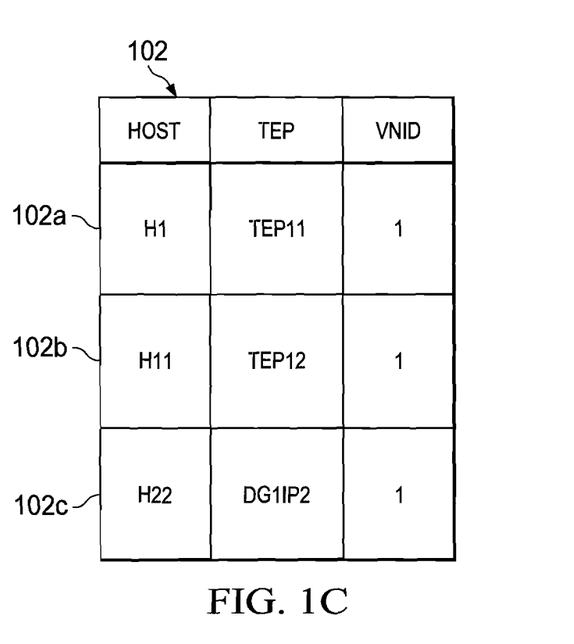
FIG. 1C is a diagram illustrating host location table data in accordance with an example embodiment of the disclosure.

Referring now to FIG. 1C, FIG. 1C illustrates a host location table 102 for TEP12 212 in accordance with an example embodiment of the disclosure. Host location table 102 includes entries in rows 102a, 102b and 102c each including a destination host. Each destination host is associated with a remote value TEP and VNID entry. For example entry 102a is for host H1 having remote values TEP11 and VNID1, and entry 102c is for host H22 having remote values TEP DG1IP2 and VNID1. If a host attached to TEP12 212, such as for example, host H11 142, has data to send to destination host H22, the Host location table 102 may be used according to the example embodiments to route the data appropriately.

FIG. 2A illustrates an example of how the information for host H22 112 is handled by the overlay control plane. The overlay control plane performs similar information transfer for multiple DTEPs and STEPs that may be within the different overlay domains, such as overlay domain1 134, overlay domain2 108 and overlay domain3 120, by communicating DTEP information for hosts with appropriate domain gateways that are local to possible STEPs in other overlay domains. For example, TEP12 140 of overlay domain1 134 may also have entries in its host location table 102 for H3 128 or H33 124 of overlay domain3 120 that are configured by the same process in the overlay control plane.

Figure 3A:
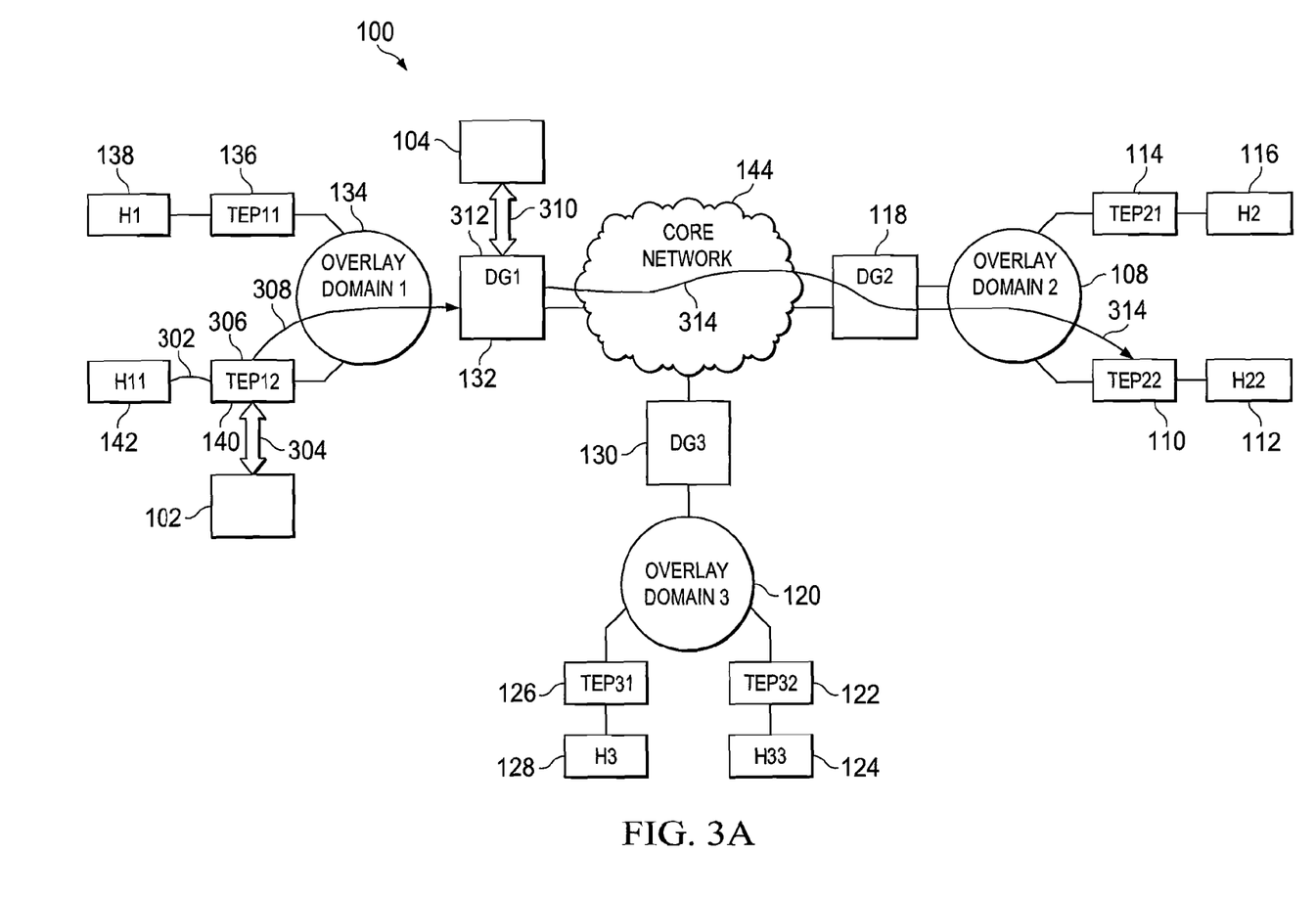
FIG. 3A is a simplified block diagram of the network of FIG. 1A illustrating operations that may be associated with a process for sending data using overlay interworking in accordance with an example embodiment of the disclosure.
Figure 3B:
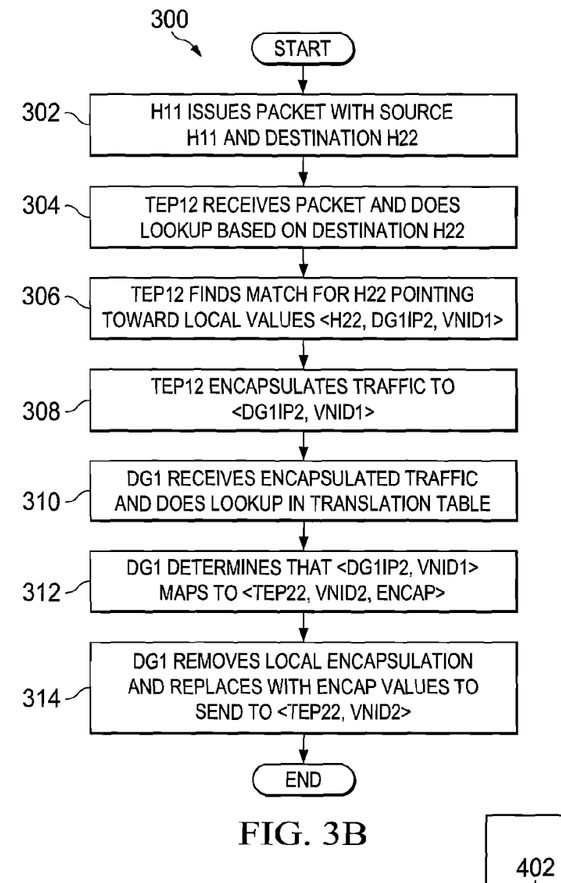
FIG. 3B is a flow diagram illustrating operations that may be associated with the process of FIG. 3A in accordance with an example embodiment of the disclosure.

Referring now to FIGS. 3A and 3B, FIG. 3A is a simplified block diagram of the network of FIG. 1A illustrating an example process for sending data using overlay interworking and FIG. 2B is a flow diagram illustrating operations that may be associated with the process of FIG. 2A in accordance with an example embodiment of the disclosure. FIGS. 3A and 3B illustrate the process that takes place when local host H11 142 in overlay domain1 134 attached to TEP12 on VNID1 needs to send a packet to a remote host H22 112 attached to TEP22 110 on VNID2 in overlay domain1 108. FIG. 3A shows a communication flow through network 100 from TEP12 140 to TEP22 110 with references numerals 302-314 showing the flow path at points in the process. The reference numerals of operations 302-314 of FIG. 3B correlate with the reference numerals of the signal flow 302-314 of FIG. 3A.

The process begins at 302, where H11 142 issues a packet with source H11 and destination H22. At 304 TEP12 140 receives the packet and performs a lookup based on the destination H22. At 306 TEP12 140 finds a match for H22 in its host location table 102 that points toward local values <DG1IP1, VNID1>. The match is based on the entry 102c in host location table 102.

At 308, TEP12 140 encapsulates the traffic for H22 to remote value <DG1IP1, VNID1>. DG1IP1 is the address on DG1 in overlay domain1 134. In an alternative embodiment, DG1IP1 may be equal to the remote TEP22 value that can only be reached by going through DG1 132 in the case where the TEP22 value is not to be translated. Next, at 310, DG1 132 receives the encapsulated traffic from TEP 12 140 and does a lookup in its translation table 104. At 312 DG1 132 determines that local value <DG1IP1, VNID1> maps to remote value <TEP22, VNID2,Encap>. The mapping determination is based on mapping entry 104b to entry 104c in table 104. Next, at 314, DG1 132 removes the local encapsulation and replaces it with encapsulation values for sending the traffic to <TEP22, VNID2>, with the encapsulation as per the Encap value specified in entry 104c.

As described, DG1 132 does not maintain any endpoint identification state (EID) state for H22 in its tables and is able to translate VNIDs between overlay domains. DG1 132 is also able to change encapsulations between domains. In the example embodiment there may be two options for ECMP/Multi-homing. If the destination host is dual-homed to two egress edge nodes (DTEPs), a Virtual IP (VIP) may be used for the two edge nodes, so that the lookup at the domain gateways is only based on one IP address. Otherwise, two FIB entries may be used. Alternatively, the overlay control protocol may provide two or more mappings, each with a VNID and a TEP destination address, for ECMP.

Figure 4:
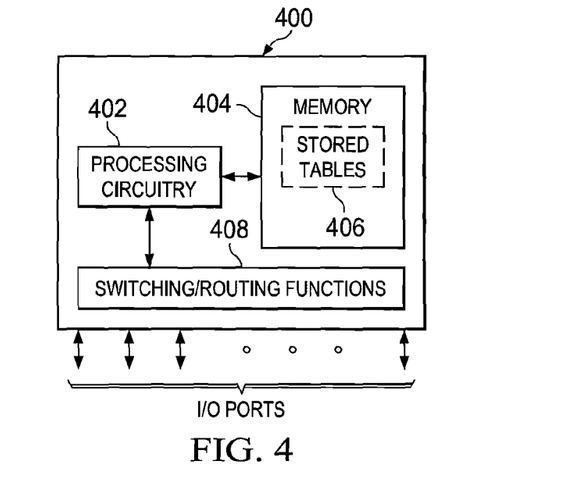
FIG. 4 is a simplified functional block diagram of a node that may be utilized for overlay interworking in accordance with an example embodiment of the disclosure.

Referring now to FIG. 4, FIG. 4 shows a simplified functional block diagram of a node 400 that may be utilized for implementing overlay network interworking in accordance with an example embodiment of the disclosure. Node 400 comprises processing circuitry 402, switching/routing functions 408, I/O ports 410, and memory 404. Processing circuitry 402, which may comprise circuitry implementing one or more processors, or be implemented in any combination of hardware and/or software, controls the switching/routing functions 408 to appropriately route traffic according to programs stored in memory 404 and to store and retrieve information in stored tables 406, according to the example embodiments. In this disclosure, the use of the term "processing circuitry" or "processor" may mean any functional implementation for performing processes according to the example embodiments.

Node 400 may be utilized to implement a Domain Gateway according to the example embodiments. Node 400 may be implemented, for example, to function as DG1 132 of FIG. 1A. Node 400 receives and sends data traffic on I/O ports 410 which, for example, as in the case of DG 1 132, would be data traffic flowing between core network 144 and overlay domain1 134.n the example embodiments processing circuitry 402 may be configured to cause DG1 132 to operate according the process described for FIGS. 2A and 3A, and stored tables 406 may include the overlay control plane DG mapping table 104 that includes the local <DGIP, VNID> to remote <TEP, VNID, Encap> information. Node 400 may be implemented in any type of network node that may perform the routing or switching functions according to the embodiments of the disclosure.

The functions for overlay network interworking implemented in a tunnel endpoint (TEP) such as, for example, TEP12 140 may also be represented by the functional blocks of node 400 of FIG. 4. In the case of TEP12 140, processing circuitry 402 and memory 404 may be configured to cause TEP12 to operate according the process operations relevant for TEP12 140 as described for FIGS. 2A and 3A, and stored tables 406 may include the overlay control plane host location table 102 that includes remote host location information, for example the <H22, DG1IP2, VNID1> location information. In the example embodiments, the TEPs may be implemented in any type of network node that may perform the routing or switching functions according to the embodiments of the disclosure, for example, the TEPs may be implemented in a virtual or physical switch or router, etc.

In terms of the infrastructure of the present disclosure, the nodes, gateways, routers, processor cores, server blades, service elements, as well as any device, host, or server are network elements (that are synonymous with 'apparatuses' and 'nodes') that can facilitate the network communication activities discussed herein. As used herein in this Specification, the term 'network element' is a broad term meant to encompass routers, switches, cable boxes, gateways, bridges, loadbalancers, cellular and WiMAX access concentrators, firewalls, inline service nodes, proxies, servers, processors, modules, endpoints, user equipment, handheld devices of any kind, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, any of the network devices, switches, routers, processor cores, server blades, service elements, etc. include software to achieve (or to foster) the network communication activities discussed herein. This could include, for example, the implementation of instances of processing circuitry 401, switching/routing functions 408, stored tables 406, etc., as shown in FIG. 4, where these modules interact, perform reciprocating functions, and/or suitably coordinate their activities with peers across the network.

For example, instances of processing circuitry 401, switching/routing functions 408, stored tables 406, etc. may be provisioned in a switch, a gateway, a router, a server, etc. Additionally, each of these elements can have an internal structure (e.g., a processor, a memory element, etc.) to facilitate any of the operations described herein. In other embodiments, these network communication activities may be executed externally to these elements, or included in some other network element to achieve the intended functionality. Alternatively, any of the aforementioned network elements may include software (or reciprocating software) that can coordinate with other network elements in order to achieve the network communication activities described herein. In still other embodiments, one or several devices (e.g., servers) may include any suitable algorithms, hardware, software, components, modules, interfaces, or objects that facilitate the operations discussed herein with respect to overlay network routing activities, etc.

Furthermore, the network elements may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These nodes may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in a communication network could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element.' Similarly, any of the potential processing elements, modules, and machines described in this Specification should be construed as being encompassed within the broad term 'processor.'

It is also important to note that the operations described with reference to the preceding FIGURES illustrate only some of the possible scenarios that may be executed by, or within, the system. Some of these operations may be deleted or removed where appropriate, or may be changed, modified or changed considerably without departing from the scope of the discussed concepts. In addition, the timing of these operations relative to one another may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

Although the present disclosure has been described in detail with reference to particular arrangements and configurations, these example configurations and arrangements may be changed significantly without departing from the scope of the present disclosure. Moreover, although the communication network has been illustrated with reference to particular elements and operations that facilitate the communication process, these elements, and operations may be replaced by any suitable architecture or process that achieves the intended functionality of the communication network.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method to be performed by a network node that interconnects overlay domains, the method comprising:
   receiving an overlay control plane message from a remote overlay domain, wherein the overlay control plane message includes a remote host identifier that identifies a remote host and remote values that identify a location of the remote host in the remote overlay domain, wherein the remote values include a tunnel endpoint identifier that identifies a tunnel endpoint through which the remote host attaches to the remote overlay domain;
   translating the remote values to local values for use in a local overlay domain to send data from a local host in the local overlay domain to the remote host in the remote overlay domain, wherein the local overlay domain connects to the remote overlay domain via the network node, and further wherein the tunnel endpoint identifier is translated to a network node identifier that identifies the network node in the local overlay domain;
   storing the remote values and corresponding local values in a mapping table for the local overlay domain, wherein the tunnel endpoint identifier corresponds with the network identifier that identifies the network node in the local overlay domain;
   advertising the local values for the remote host in the local overlay domain, wherein the local values include the network node identifier that identifies the network node in the local overlay domain, wherein the local values for the remote host are advertised to a tunnel endpoint through which the local host attaches to the local overlay domain;
   sending a data packet destined for the remote host to the location in the remote overlay domain that is identified by the remote values;
   receiving a data packet destined for the remote host that identifies the local values;
   performing a lookup in the mapping table based on the local values to determine the remote values mapped to the local values; and
   sending the data packet to the location in the remote overlay domain that is identified by the remote values;
   wherein the remote values include a first virtual network identifier that identifies a first virtual network through which the remote host attaches to the remote overlay domain; and
   wherein the translating the remote values to local values includes translating the first virtual network identifier to a second virtual network identifier that identifies a second virtual network in the local overlay domain.

2. The method of claim 1, wherein the remote values identify a remote tunnel endpoint and a virtual network through which the remote host attaches to the remote overlay domain.

3. The method of claim 1, wherein the network node does not store the remote host identifier.

4. The method of claim 1, wherein the advertising the local values includes advertising an address that identifies the network node in the local overlay domain.

5. The method of claim 1, wherein the storing further comprises storing an encapsulation indicator with the remote values, the encapsulation indicator indicating an encapsulation scheme for the remote overlay domain.

6. An apparatus, comprising:
   a memory configured to store data; and
   a processor operable to execute instructions associated with the data, wherein the processor and the memory cooperate, such that the apparatus is configured to:
   receive an overlay control plane message from a remote overlay domain, wherein the overlay control plane message includes a remote host identifier that identifies a remote host and remote values that identify a location of the remote host in the remote overlay domain, wherein the remote values include a tunnel endpoint identifier that identifies a tunnel endpoint through which the remote host attaches to the remote overlay domain;
   translate the remote values to local values for use in a local overlay domain to send data from a local host in the local overlay domain to the remote host in the remote overlay domain, wherein the tunnel endpoint identifier is translated to a network node identifier that identifies a network node in the local overlay domain, wherein the network node connects the local overlay domain to the remote overlay domain;
   store the remote values and corresponding local values in a mapping table for the local overlay domain, wherein the tunnel endpoint identifier corresponds with the network identifier that identifies the network node in the local overlay domain;
   advertise the local values for the remote host in the local overlay domain, wherein the local values include the network node identifier that identifies the network node in the local overlay domain, wherein the local values for the remote host are advertised to a tunnel endpoint through which the local host attaches to the local overlay domain;

send a data packet destined for the remote host to the location in the remote overlay domain that is identified by the remote values;

receive a data packet destined for the remote host that identifies the local values;

perform a lookup in the mapping table based on the local values to determine the remote values mapped to the local values; and send the data packet to the location in the remote overlay domain that is identified by the remote values sending the data packet to the location in the remote overlay domain that is identified by the remote values;

wherein the remote values include a first virtual network identifier that identifies a first virtual network through which the remote host attaches to the remote overlay domain; and wherein the translating the remote values to local values includes translating the first virtual network identifier to a second virtual network identifier that identifies a second virtual network in the local overlay domain.

7. The apparatus of claim 6, further configured to store an encapsulation indicator with the remote values, the encapsulation indicator indicating an encapsulation scheme for the remote overlay domain.

8. A non-transitory tangible media that includes code for execution, and when executed by a processor, is operable to perform operations comprising:

receiving an overlay control plane message from a remote overlay domain, wherein the overlay control plane message includes a remote host identifier that identifies a remote host and remote values that identify a location of the remote host in the remote overlay domain, wherein the remote values include a tunnel endpoint identifier that identifies a tunnel endpoint through which the remote host attaches to the remote overlay domain;

translating the remote values to local values for use in a local overlay domain to send data from a local host in the local overlay domain to the remote host in the remote overlay domain, wherein the local overlay domain connects to the remote overlay domain via the network node, and further wherein the tunnel endpoint identifier is translated to a network node identifier that identifies a network node in the local overlay domain, wherein the network node connects the local overlay domain to the remote overlay domain;

storing the remote values and corresponding local values in a mapping table for the local overlay domain, wherein the tunnel endpoint identifier corresponds with the network identifier that identifies the network node in the local overlay domain;

advertising the local values for the remote host in the local overlay domain, wherein the local values include the network node identifier that identifies the network node in the local overlay domain, wherein the local values for the remote host are advertised to a tunnel endpoint through which the local host attaches to the local overlay domain;

sending a data packet destined for the remote host to the location in the remote overlay domain that is identified by the remote values;

receiving a data packet destined for the remote host that identifies the local values;

performing a lookup in the mapping table based on the local values to determine the remote values mapped to the local values; and sending the data packet to the location in the remote overlay domain that is identified by the remote values sending the data packet to the location in the remote overlay domain that is identified by the remote values;

wherein the remote values include a first virtual network identifier that identifies a first virtual network through which the remote host attaches to the remote overlay domain; and wherein the translating the remote values to local values includes translating the first virtual network identifier to a second virtual network identifier that identifies a second virtual network in the local overlay domain.

9. The non-transitory tangible media of claim 8, the operations further comprising storing an encapsulation indicator with the remote values, the encapsulation indicator indicating an encapsulation scheme for the remote overlay domain.

* * * * *